United States Patent [19]

Anderson

[11] Patent Number: 5,165,175
[45] Date of Patent: Nov. 24, 1992

[54] REVERSE IMAGE DRAWING APPARATUS

[76] Inventor: James G. Anderson, 8139 Oxford Rd., Longmont, Colo. 80503

[21] Appl. No.: 786,183

[22] Filed: Oct. 31, 1991

[51] Int. Cl.[5] ............................................. B43L 13/10
[52] U.S. Cl. ................................. 33/23.05; 33/23.11; 33/24.3; 33/25.1
[58] Field of Search ................... 33/23.05, 23.11, 24.1, 33/24.3, 25.1

[56] References Cited

U.S. PATENT DOCUMENTS

| | | | |
|---|---|---|---|
| 400,268 | 3/1889 | Thompson | 33/24.3 |
| 750,923 | 2/1904 | Wheelan | 33/24.3 |
| 1,662,830 | 3/1928 | Lund | 33/24.3 |
| 1,956,505 | 4/1934 | Horner | 33/23.11 |
| 2,543,561 | 2/1951 | Tracy | 33/23.11 |
| 3,333,341 | 8/1967 | Wuerthner | 33/25.1 |
| 3,392,262 | 7/1968 | Hausen et al. | 33/25.1 |
| 3,417,472 | 12/1968 | Nelson | 33/24.3 |
| 3,417,477 | 12/1968 | Nowotny | 33/23.11 |
| 3,453,933 | 7/1969 | Kornhauser | 33/23.11 |
| 4,604,007 | 8/1986 | Hall et al. | 33/23.11 |

FOREIGN PATENT DOCUMENTS

| | | | |
|---|---|---|---|
| 413326 | 11/1923 | Fed. Rep. of Germany | 33/24.3 |
| 1089013 | 3/1955 | France | 33/23.05 |
| 0702233 | 12/1979 | U.S.S.R. | 33/243 |
| 0024187 | of 1894 | United Kingdom | 33/23.05 |

Primary Examiner—Thomas B. Will
Attorney, Agent, or Firm—Donald W. Margolis; Edwin H. Crabtree

[57] ABSTRACT

A mirror image apparatus for use with a pantograph for drawing, engraving, milling, and similar applications wherein tracing and creating a mirror or reverse image is required. The apparatus is characterized by broadly having a stylus which operates between a first plane and a second plane. The first and second planes are parallel to each other with the second plane disposed above the first plane. One end of the stylus is used for drawing an image or tracing an image on the first plane while an opposite end of the stylus is used for engaging and creating on the second plane a mirror image of the drawing or tracing produced on the first plane. When drawing, the stylus may be a pen, pencil or any other drawing instrument wherein the stylus has opposite ends for drawing an image on the first plane while at the same time creating a mirror image on the second plane. When tracing with the stylus and using a template, the template may be mounted face up on a top surface of the first plane or mounted face down on a bottom surface of the second plane. While an image is traced by one end of the stylus in the template, the opposite end of the stylus creates a mirror image on the adjacent and parallel plane. The apparatus can further have a first stylus with one end drawing or tracing on the first plane and a second stylus pointed in an opposite direction from the first stylus. The second stylus engages the second plane for creating a mirror image of the drawing or tracing produced on the first plane.

20 Claims, 4 Drawing Sheets

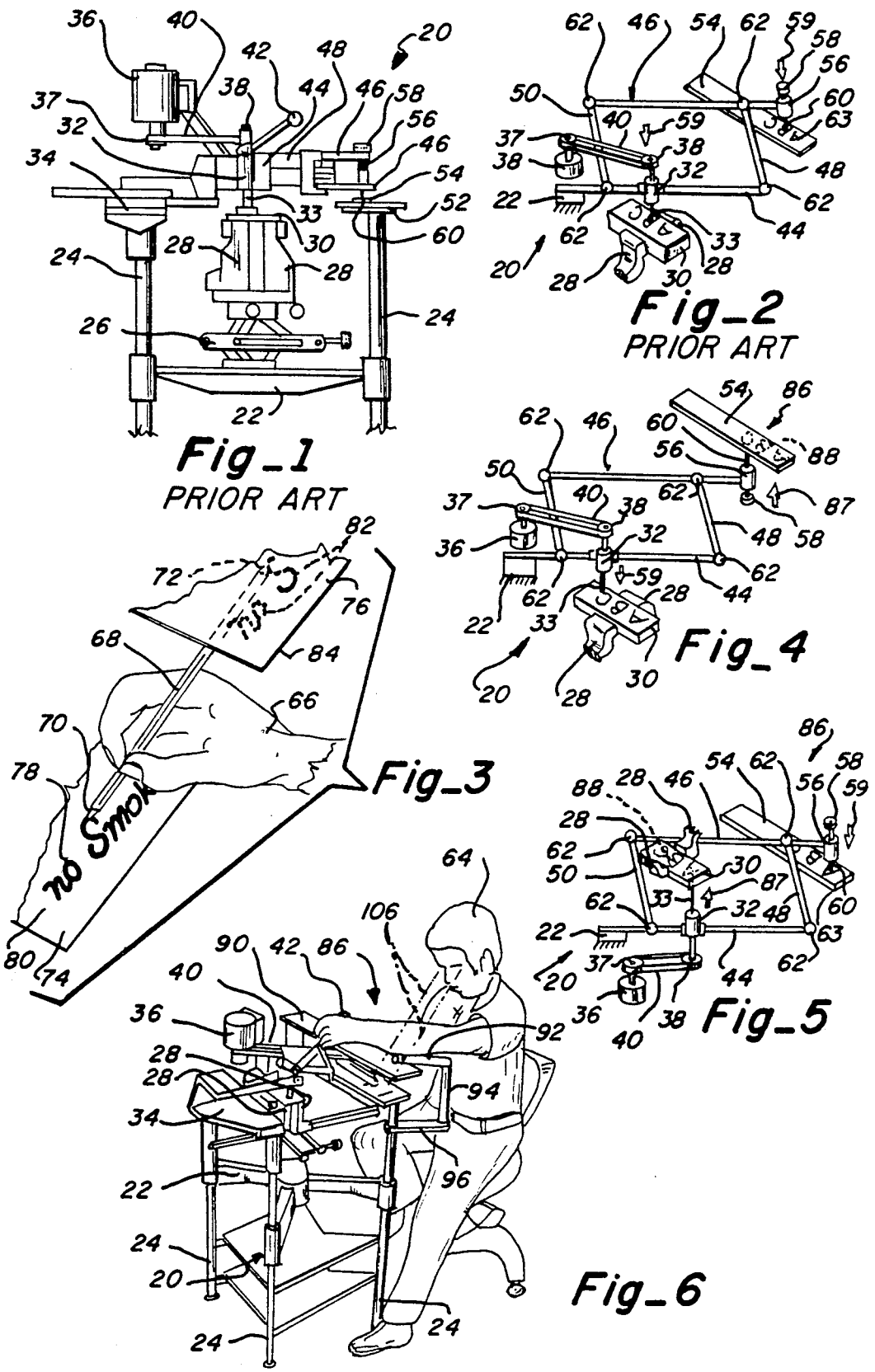

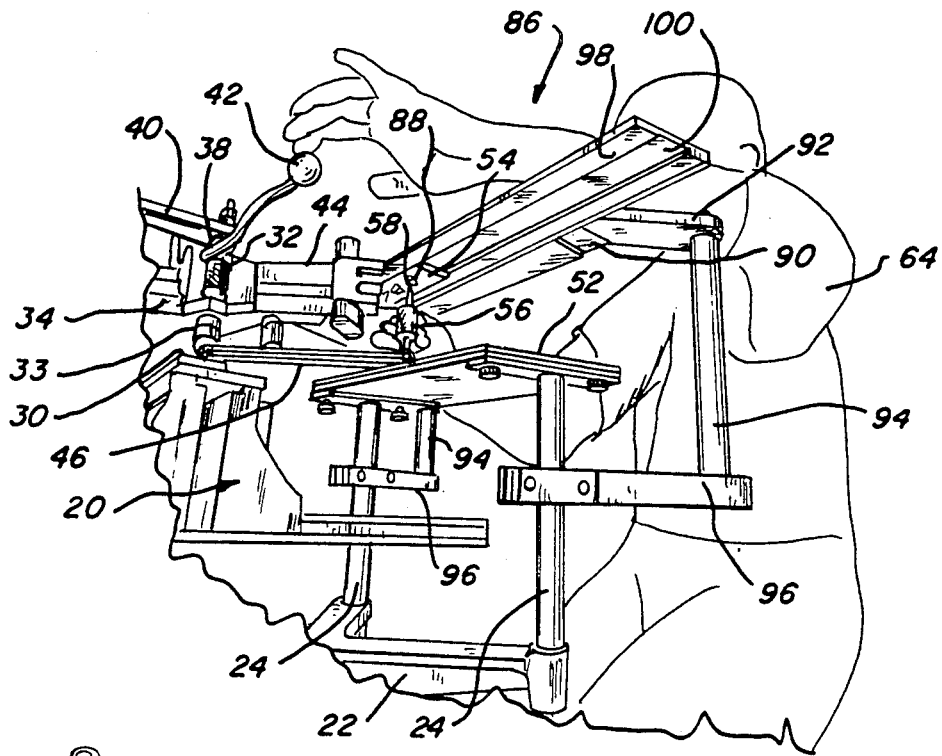
Fig_7
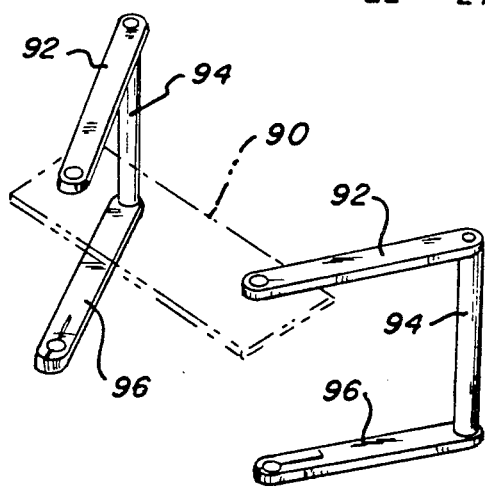
Fig_8
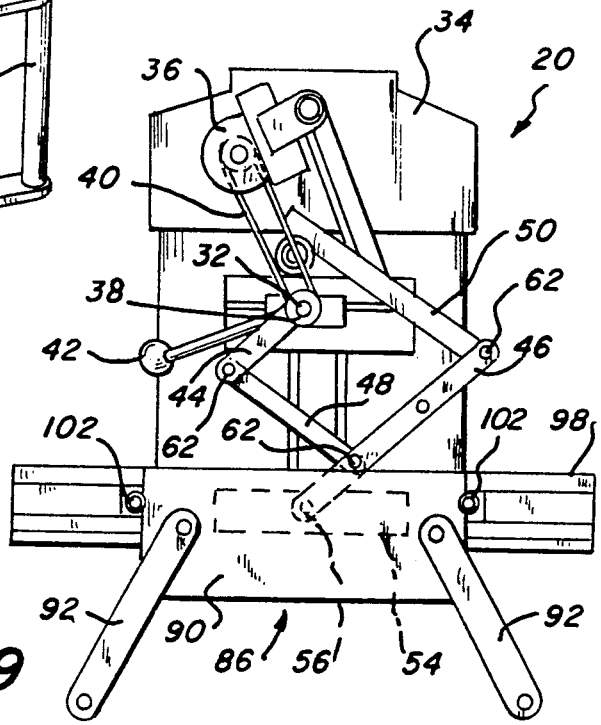
Fig_9

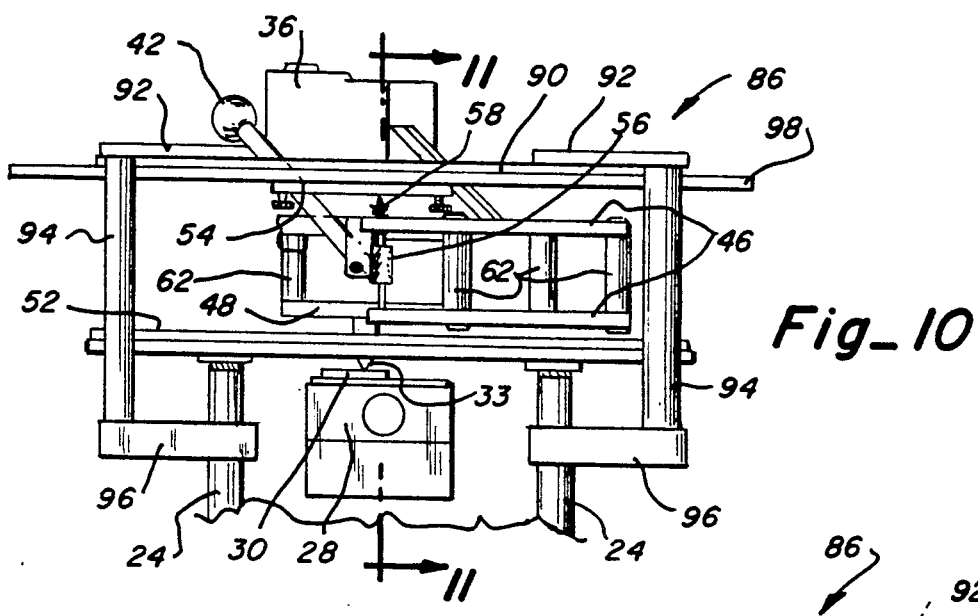
*Fig_10*
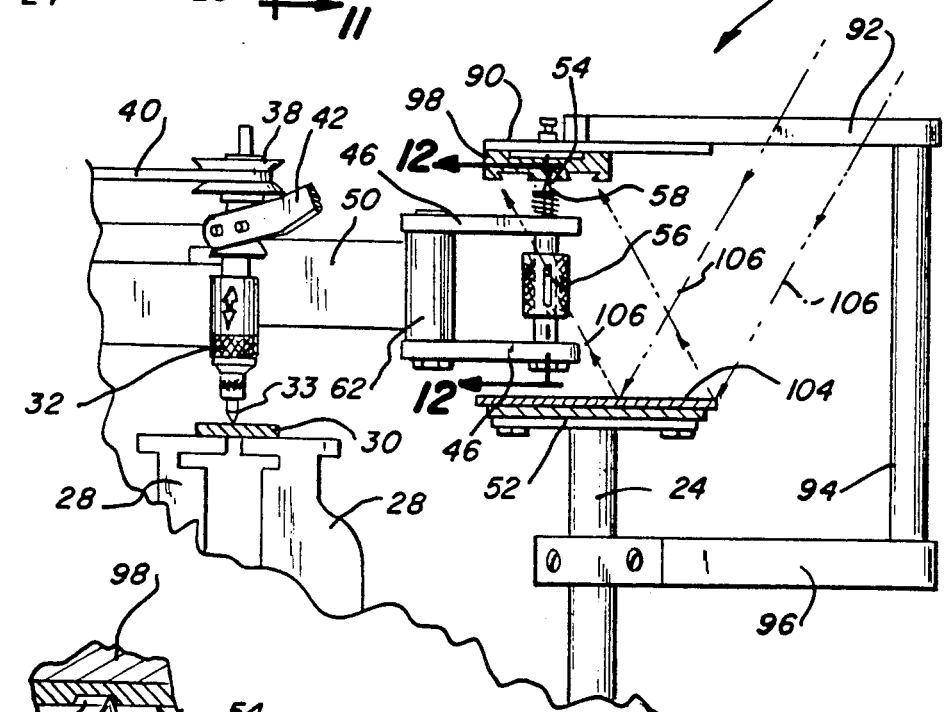
*Fig_11*
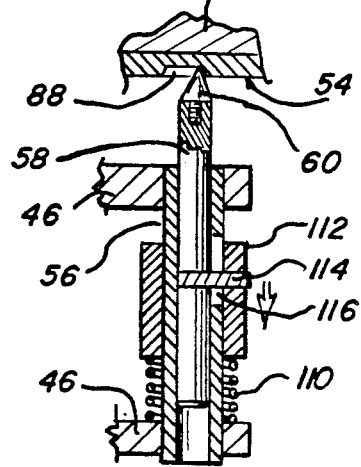
*Fig_12*

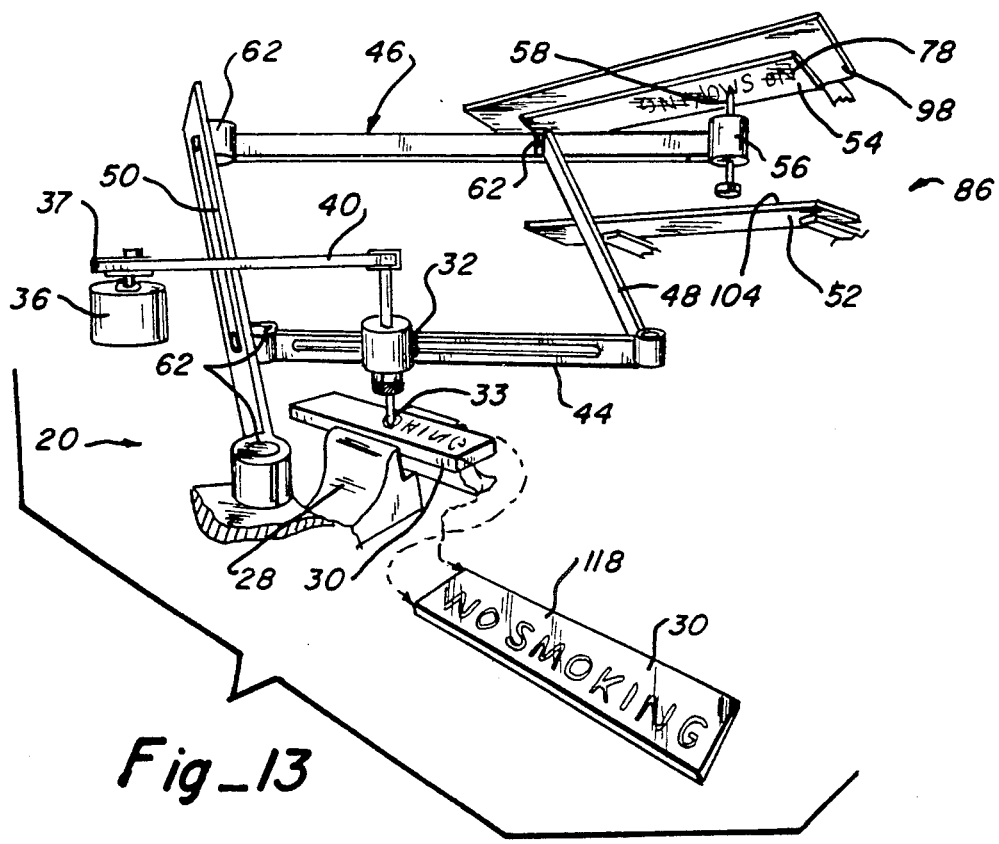
Fig_13
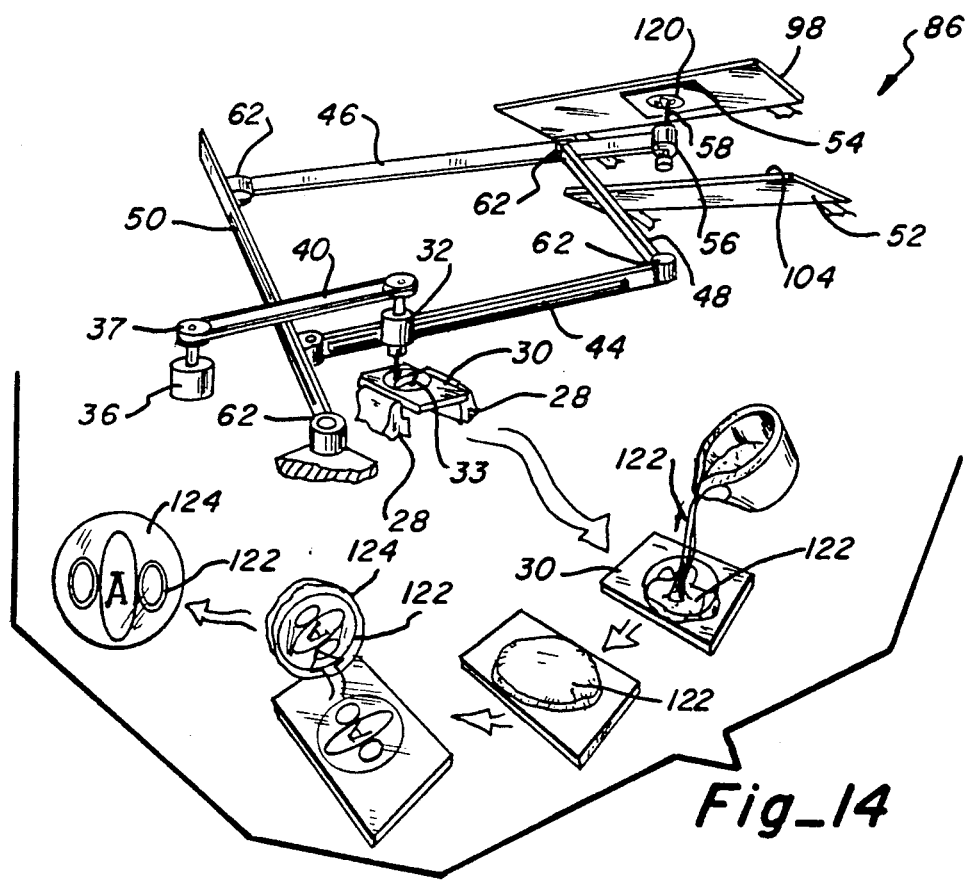
Fig_14

REVERSE IMAGE DRAWING APPARATUS

BACKGROUND OF THE INVENTION (A) Field of the Invention

This invention relates to the use of a stylus used in drawing an image or tracing an image, and more particularly, but not by way of limitation to the use of a stylus in the art of pantography for creating a reverse or mirror image of a drawing, engraving, tracing, casting, mold, and the like.

(B) Discussion of the Prior Art

In the field of pantography, a pantograph machine is used for drawing, copying, and engraving wherein a template is used to guide a first stylus while a second stylus is used to reproduce the exact image from the template. The reproduced image can be enlarged or reduced during the operation. With the advent of computerized equipment, software programs have been developed for producing reverse images under computer control. While the computerized equipment has proved successful, the cost of this type equipment is expensive.

In U.S. Pat. No. 548,327 to Russell et al; U.S. Pat. No. 841,223 to Bronner; U.S. Pat. No. 3,775,852 to Sandim; and U.S. Pat. No. 4,733,473 to Goldfarb various types of pantographic and drawing devices are disclosed wherein intermeshing gearing is used to create a duplicated mirror or reverse image of a drawing. These prior art apparatus, while having the ability to create a reverse image, operate with a plurality of stylus in a single copy plane. The subject invention is unique in structure and provides advantages which heretofore were not available in the field of pantography and related industries requiring equipment which will reproduce a mirror image of a drawing, engraving, and the like.

SUMMARY OF THE INVENTION

In view of the foregoing, it is an object of the present invention to produce a reverse or mirror image of an image that is drawn or copied from a template.

Another object of the invention is the mirror image apparatus is readily adaptable to existing pantograph equipment and can quickly be installed for developing mirror images thereby doubling the potential use of the equipment.

A further object of the invention is the apparatus can be used in a variety of fields other than pantography such as machine milling, die making and casting, woodworking, drafting, sign making, and other fields where a reproduced mirror image is advantageous.

Yet other objects of the invention are various types of drawings, engravings, castings, and the like can be reproduced quickly and inexpensively in a desired mirror image which heretofore was not available with existing equipment.

The subject mirror image apparatus includes broadly a stylus which operates between a first plane and a second plane. The first and second planes are parallel to each other with the second plane disposed above the first plane. One end of the stylus is used for engaging and drawing an image or tracing an image on the first plane while an opposite end of the stylus is used for engaging and creating on the second plane a mirror image of the drawing or tracing produced on the first plane. When drawing, the stylus may be a pen, pencil, or any other drawing instrument wherein the stylus has opposite ends for drawing an image on the first plane while at the same time creating a mirror image on the second plane. When tracing with the stylus and using a template, the template may be mounted face up on a top surface of the first plane or mounted face down on a bottom surface of the second plane. While an image is traced by one end of the stylus in the template, the opposite end of the stylus creates a mirror image on the adjacent and parallel second plane. The apparatus can further have a first stylus with one end drawing or tracing on the first plane and connected to one end of a parallelogram while a second stylus parallel to the first stylus is connected to an opposite end of the parallelogram. The second stylus is pointed in an opposite direction from the first stylus and engages the second plane for creating a mirror image of the drawing or tracing produced on the first plane.

These and other objects of the present invention will become apparent to those skilled in the art from the following detailed description, showing the contemplated novel construction, combination, and appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 1 is a front view of a prior art pantograph with a stylus engaging a template while at the same time a cutting tool is engaging a work piece for engraving a duplicate of the image on the template.

FIG. 2 is a perspective view of a prior art pantograph with the stylus tracing ABC on the template while the cutting tool is reproducing ABC on the work piece.

FIG. 3 is a perspective view of the broad principal of the subject invention wherein a human hand is shown with a stylus having a first pointed end drawing a NO SMOKING sign on a top surface of a first plane while at the same time a second end of the stylus is drawing a mirror image of the NO SMOKING sign on a bottom surface of a second plane.

FIGS. 4 and 5 are perspective views of a pantograph adapted for drawing or engraving a mirror image of an image traced by a stylus on a template.

FIG. 6 is a perspective view of a pantograph with the subject mirror image apparatus mounted thereon for creating a mirror image on a workpiece from a template mounted thereon.

FIG. 7 is a perspective view of the pantograph shown in FIG. 6 and looking upward under the pantograph and showing a stylus received in a template mounted upside down on the mirror image apparatus.

FIG. 8 is a perspective view of a portion of the subject invention.

FIG. 9 is a top view of the subject mirror image apparatus.

FIG. 10 is a front view of the top portion of the pantograph with the mirror image apparatus mounted thereon.

FIG. 11 is a side view, partially in cross-section of the apparatus taken along lines 11—11 shown in FIG. 10.

FIG. 12 is a cross-sectional view of a spring biased stylus pointed upwardly and engaging a template mounted on the apparatus and taken along lines 12—12 shown in FIG. 11.

FIGS. 13 and 14 are perspective views of the subject invention mounted on the pantograph and shown making a NO SMOKING sign on a transparent work piece and making a mirror image of a mold for cast a piece of jewelry.

DESCRIPTION OF THE PREFERRED EMBODIMENT

Referring to FIG. 1, a prior art pantograph is shown having a general reference numeral 20. The pantograph 20 includes a table 22 supported by table legs 24. Mounted on top of the table 22 is a vertical adjustment jack 26 for holding a work piece clamp 28. The clamp 28 holds a workpiece 30 securely so that a stylus chuck 32 holding a first stylus such as a cutting tool 33 can be used to engrave an image on the workpiece 30. While the cutting tool 33 is shown, it should be kept in mind that the tool 32 can be different types of stylus such as a scribe, a router, a drill bit, and any other type tool that might be used for image reproduction. Mounted on top of two of the table legs 24 is a motor support frame 34 for holding a drive motor 36. The motor 36 is connected to a drive pulley 37 which in turn is connected to a driven pulley 38 via a pulley belt 40. The pulley 38 is mounted to the top of the stylus 32 for rotating the tool 33 thereon when the motor 36 is turned on. A handle 42 is attached to the stylus chuck 32 for raising and lowering the chuck 32 on the frame 34. When the work piece 30 is properly positioned on the clamp 28 and secured thereto and the motor 36 turned on, the handle 42 is used to lower the cutting tool 33 on to the top of the work piece 30 for reproducing an image thereon. The stylus chuck 32 is mounted on a portion of a first stylus support arm 44 which is parallel to a second stylus support arm 46. The two support arms 44 and 46 are interconnected via a pair of parallel connecting arms 48 and 50. The support arms 44 and 46 together with the connecting arms 48 and 50 form a parallelogram, so that any type of stylus connected thereto can operate in tandem.

Referring now to the right hand side of FIG. 1, the table 22 includes a template stand 52 mounted on top of a pair of the legs 24. Both of the legs 24 can be seen in FIG. 7. The stand 52 is adapted for receiving and clamping a template 54 to be traced thereon. At one end of the second stylus support arm 46 is mounted a second stylus chuck 56 having a pointed guide pin 58 mounted downwardly thereon as indicated by arrow 59. The arrow 59 is shown in FIG. 2. A pointed end 60 of the pin 58 is received in a portion of the engraved image in the template 52.

In FIG. 2 a perspective view of an upper portion of the pantograph 20 is illustrated. In this view a simplified version of the support arms 44 and 46 and the connecting arms 48 and 50 are shown making up a parallelogram. The arms are connected to each other by pivots 62. In a typical operation of the pantograph 20, an image, which is desired to be reproduced, is chosen on the template 54. The template 54 is secured on the template stand 52 and the pointed end 60 of the guide pin 58 is received in a portion of the image in the template 54. In this example, the image of an "ABC" sign 63 all in capital letters has been chosen for reproduction. In the art of pantography, the pantograph 20 is designed to either enlarge, reduce, or duplicate the image that is being reproduced. Also while the template 54 is being set up, the workpiece 30 is clamped into place below the cutting tool 33. As the pin 58 is guided on the surface of the template 54 tracing the "ABC" sign 63, at the same time when the handle 42 is moved downwardly by an operator 64, shown in FIG. 6, the cutting tool 33 engages the surface of the workpiece 30 and an exact copy of an image of the "ABC" sign 63 is produced on the workpiece 30. In FIG. 2 the reproduced copy of the "ABC" sign 63 on the workpiece is made slightly smaller than the image on the template 54. While the subject prior art pantograph 20 is shown in a typical operation making a reproduced copy of an image on a template, heretofore the pantograph 20 was not capable of creating on a workpiece 30, a mirror image of different types of images on the template 54. The template 54 operates in a separate but parallel plane from the plane of the workpiece 30.

In FIG. 3 a perspective view of the principal behind the subject invention of drawing or engraving a mirror image with a pantograph is shown. In this drawing, a human hand 66 is shown holding a scribe 68 having a marker at a first pointed end 70 and a marker at a second pointed end 72. The scribe 68 is disposed between and perpendicular to a first drawing plane 74 and a second drawing plane 76. The two planes 74 and 76 are parallel to each other. The hand 66 moving the scribe 68 perpendicular to the two planes draws, in this example, the start of a "NO SMOKING" sign 78. Note while the hand 66 is drawing the sign on a top surface 80 of the plane 74, at the same time the sign is being drawn in a mirror image 82 on a bottom surface 84 of the second plane 76. The mirror image 82 is shown in dotted lines in FIG. 3.

In FIGS. 4 and 5 the principal as discussed in FIG. 3 is now incorporated into the subject mirror image apparatus having general reference numeral 86. The apparatus 86 coupled with the pantograph 20 now provides the operator 64 a way of quickly and efficiently producing a mirror image from a template. In FIG. 4 the template 54 and guide pin 58 have been turned upside down with the guide pin 58 now pointing up as indicated by arrow 87. The guide pin 58 now traces an image 88 on the template 54 of the "ABC" sign 63. At the same time a mirror image of "ABC" is produced on the work piece 30. In FIG. 5 the template 54 is in a normal right side up position with the guide pin 58 pointing down as indicated by arrow 59. In this example of the apparatus 86, the cutting tool 33 on the chuck 32 has been turned upside down as indicated by arrow 87. Also the work piece 30 and clamp 28 have been moved to a position above the cutting tool 33. Therefore when the tool 33 is raised by the handle 42, the tool 33 engages the bottom side of work piece 30 and a mirror image 88 of "ABC" is produced. Note in FIG. 5 that if the work piece 30 is made of a transparent material, the mirror image 88 would appear as a normal image when looking through the top thereof.

In FIG. 6 a perspective view of the pantograph 20 shown in FIG. 1 is illustrated with the mirror image apparatus 86 attached thereto. The apparatus 86 includes the pantograph 20 with the guide pin 58 pointed upwardly on the chuck 56 as shown in FIG. 4. The apparatus 86 also includes a template support plate 90 attached to a pair of upper support arms 92. The support arms 92 are attached to an upper end of a pair of vertical spacers 94. A lower end of the spacers 94 is attached to one end of a pair of lower support arms 96. An opposite end of the lower support arms 96 is adjustably mounted and clamped to a pair of the table legs 24. The above mentioned structure of the apparatus 86 is seen in a perspective view in FIG. 8.

In FIG. 7 a perspective view looking upward illustrates a portion of the pantograph 20 and the mirror image apparatus 86 attached thereto. In this view the lower support arms 96 can be seen attached to two of the table legs 24 and the upper support arms 92 holding the new template support plate 90 above the upside down guide pin 58 attached to the second stylus chuck 56. Mounted underneath the support plate 90 is a template guide 98 having a groove 100 along the length thereof for receiving various types of templates such as template 54. The template guide 98 is held in place on the support plate by clamps 102 shown in FIG. 9. The operator 64 in this view is tracing the image 88 held upside down on the template 54 with the guide pin 58. At this time with his left hand, the operator 64 grips the handle 42 to lower the cutting tool 33 and start the engraving of a reverse or mirror image of the image 88 on the template 54.

In FIG. 9 a top view of the pantograph 20 and mirror image apparatus 86 is shown. In this view the stylus chucks 32 and 56 are shown attached to the two parallel support arms 44 and 46 and connecting arms 48 and 50 making up a parallelogram which is used for ease in tracing, engraving, drawing and the like. It should be kept in mind that while a parallelogram is shown in the drawings, a rigid connecting arm connected at both ends to two scribes or stylus would work equally well when used in conjunction with the subject invention.

FIG. 10 illustrates a front view of the upper portion of the pantograph 20 and the mirror image apparatus 86 shown in FIG. 9. In this drawing the pointed end of the guide pin 58 held by the stylus chuck 56 can be seen engaging the template 54 which has been secured upside down on the template guide 98. The guide pin 58 is in a position for being guided through the image on the template 54. Also a pointed end of the cutting tool 33 can be seen resting on top of the work piece 30 prior to the engraving of the work piece 30. The engraving would start when the motor 36 is turned on and the handle 42 used to lower the stylus chuck 32 and cutting tool 33 for engaging the work piece 30.

In FIG. 11 a sectional view of the pantograph 20 and mirror image apparatus 86 is shown in an enlarged view taken along lines 11—11 shown in FIG. 10. In this view an end view of the template stand 52 is shown with a mirror 104 mounted thereon. By placing the mirror 104 on the stand 52, the operator 64 can better follow the tracing operation of the guide pin 58 when it engages the image in the template 54. The viewing of the tracing operation is shown as dotted lines 106. These dotted lines can also be seen in FIG. 6.

FIG. 12 is a cross sectional view of the second stylus chuck 56 and taken along lines 12—12 shown in FIG. 11. The chuck 56 has guide pin 58 received therein with the pin 58 including the pointed end 60 threaded in the top of the pin 58. The pointed end 60 is spring biased upwardly by a coil spring 110 engaging the bottom of a collar 112 disposed around the chuck 56. The collar 112 is attached to the pin 58 by a key 114 received through a slot 116 along a portion of the length of the chuck 56. The pointed end 60 is shown received in a portion of the image 88 engraved in the template 54. Since the guide pin 58 is in an upside down mode, the spring bias from the coil spring 110 helps maintain constant pressure on the pointed end 60 as it is moved in the template 54 tracing the image 88. When it is desired to remove or replace the template 54, the guide pin 58 can be removed from engagement thereof by gripping the collar 112 and pressing downward against the force of the spring 110 with the key 114 moving downwardly in the slot 116 in the side of the chuck 56. When the collar 112 is again released, the guide pin 58 is moved upwardly by the force of the spring 110.

In FIG. 13 a perspective view of the apparatus 86 with the pantograph 20 is shown with the guide pin 58 tracing the "NO SMOKING" sign 78 on the template 54. At the same time the cutting tool 33 is engraving a mirror image of the "NO SMOKING" sign 78 on a transparent work piece 30. When the cutting of the sign 78 has been completed and the work piece 30 released from the clamp 28, the work piece 30 is turned over to show a completed sign 118. The completed sign 118 illustrates the "NO SMOKING" sign in its normal reading form, since the work piece 30 is transparent and the engraved mirror image on the back side of the work piece 30 transmits therethrough as a readable sign.

In FIG. 14 another perspective view of the apparatus 86 and pantograph 20 are shown wherein the template 54 has an engraved letter design 120 thereon. The design 120 is copied in a mirror image 121 on the work piece 30. In this example the work piece may be of a brass stock or any other suitable material used for making dies and molds. The work piece 30 with mirror image 121 is then used for receiving a hot wax 122. The wax 122 when cooled and removed from the work piece 30 now represents a cast 124. The cast 124 with raised letters and made of the wax 122, is suitable to be directly cast, through the lost wax process, into precious metals for jewelry such as monogrammed cuff links, buttons, and the like.

While the above drawings show the apparatus 86 and pantograph 20 with the first stylus chuck 32 holding a cutting tool 33 and a second stylus chuck 56 holding a guide pin 58, it should be kept in mind that a plurality of different stylus could under the control of a guide pin such as 58 using a template 54 with an image thereon. With this in mind drawing an image using a stylus more than one mirror images may be created using one or more stylus disposed in a reverse direction from the direction of the stylus tracing the image.

While the invention has been particularly shown, described and illustrated in detail with reference to preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The invention which is claimed is:

1. An apparatus for producing a mirror image on a workpiece of an original image which is drawn or traced on a template, the apparatus being designed to be mounted on a stand, the apparatus comprising:

a first stylus including a normally upwardly disposed end for drawing or tracing on a template;

a pair of upper support arms having a first end and a second end, said second end of said upper support arms being attached to an upper end of a pair of vertical spacers, the lower end of said vertical spacers being attached to a second end of a pair of lower support arms, the first end of said lower support arms being attached to the stand;

an adjustable template support plate for carrying a template, said adjustable template support plate and any template which it carries being disposed above said upwardly disposed end of said first stylus, so that said upwardly disposed end of said first stylus is positioned to be placed into contact with any such template during drawing or tracing operations, said template support plate being attached to and carried by said first end of said upper support arms;

a second stylus including an end for drawing, which is normally disposed in a substantially downward direction for engagement with a workpiece for drawing thereon; and connecting means for connecting said first stylus to said second stylus, whereby said second stylus is capable of producing a mirror image on the workpiece of an image drawn or traced by said first stylus on a template.

2. An apparatus for producing a mirror image on a second workpiece of an original image which is drawn or traced on a first workpiece, the apparatus being designed to be mounted on a stand, the apparatus including in combination, a first stylus including an end which is normally disposed in a substantially upward direction for drawing or tracing on the first workpiece, a second stylus including an end for drawing on the second workpiece, the end of the second stylus being normally disposed in a substantially downward direction, for engagement with the second workpiece for drawing thereon, and connecting means for connecting the first stylus to the second stylus, wherein the improvement comprises:

a pair of vertical spacers, each spacer having an upper end and a lower end;

a pair of upper support arms, each upper support arm having a first end and a second end, said second end of each said upper support arm being attached to said upper end of an associated vertical spacer;

a pair of lower support arms, each lower support arm having a first end and a second end, with the lower end of each said vertical spacer being attached to said second end of an associated lower support arm, the first end of each said lower support arm being designed for attachment to the stand; and a first workpiece support plate, for carrying the first workpiece, said first workpiece support plate and any first workpiece which it carries being disposed above the upwardly disposed end of the first stylus so that the upward end of the first stylus is capable of being placed into contact with the first workpiece during drawing or tracing operations, said first workpiece support plate being attached to and carried by said first ends of said upper support arms; whereby the second stylus is capable of producing a mirror image on the second workpiece of an image drawn or traced by the first stylus on the first workpiece.

3. The apparatus of claim 2 wherein the means for connecting the first stylus to the second stylus includes a plurality of arms defining a parallelogram structure, with the first stylus and the second stylus being attached to opposed portions of said parallelogram structure.

4. The apparatus of claim 2 wherein there is provided means for urging the drawing or tracing end of the first stylus against the first workpiece carried by the first workpiece support plate.

5. The apparatus of claim 4 wherein the support plate is adjustable.

6. The apparatus of claim 4 wherein said urging means includes a spring.

7. The apparatus of claim 6 wherein said urging means includes a spring biased chuck attached to said first stylus for applying pressure and biasing the end of the first stylus against the first workpiece.

8. The apparatus as described in claim 7 wherein the end of said first stylus is pointed and removable for receiving different size pointed ends when tracing in different size openings in said first work piece.

9. The apparatus as described in claim 2 wherein the first workpiece is removably mounted on the support plate.

10. The apparatus as described in claim 2 wherein the first end of said pair of lower support arms is attached to a pair of stand legs, the stand legs being part of the stand for receiving the apparatus thereon.

11. The apparatus as described in claim 10 wherein said lower support arms are adjustably mounted on said stand legs for raising and lowering said workpiece above said first stylus.

12. The apparatus as described in claim 10 further including a mirror which is mounted on top of said stand legs and located parallel to and disposed below said first workpiece, said mirror being located to allow a person using said apparatus to view an image on said first work piece.

13. The apparatus as described in claim 3 wherein said parallelogram is composed of a pair of parallel attachment arms and a pair of parallel connecting arms, and wherein said first stylus is attached to one of said attachment arms and said second stylus is attached to another of said attachment arms.

14. The apparatus as described in claim 2 wherein said first workpiece and said second workpiece are vertically spaced apart and substantially parallel to one another.

15. The apparatus as described in claim 2 wherein said second stylus is in the form of a drawing instrument.

16. The apparatus as described in claim 2 wherein said second stylus is the form of a cutting tool.

17. An apparatus for use with a pantograph mounted on a stand which includes a first stylus including a pointed end oriented in a first direction for drawing or tracing an image on a first workpiece and a second stylus including an end oriented in a second direction for drawing on a second workpiece and producing a mirror image on the second workpiece, wherein the improvement comprises:

a template support plate with a template removably mounted thereon, said template support plate and template being part of said first workpiece, said template support plate attached to one end of a pair of upper support arms, the other end of said upper support arms attached to one end of a pair of vertical spacers, the other end of said vertical spacers attached to one end of a pair of lower support arms, the other end of said lower support arms attached to the stand.

18. The apparatus as described in claim 17 further including a spring biased chuck attached to said first stylus for applying pressure to said first stylus and biasing the pointed end of said first stylus on said template.

19. The apparatus as described in claim 17 further including a mirror which is mounted on top of the stand and located parallel to and disposed below said first workpiece, said mirror being located to allow a person using said apparatus to view an image on said template.

20. The apparatus as described in claim 17 wherein said lower support arms are adjustably mounted on the stand for raising and lowering said workpiece above said first stylus.

* * * * *